April 4, 1967  G. A. HUPPENTHAL  3,312,326
ARTICLE ORIENTING APPARATUS
Filed Aug. 23, 1965  3 Sheets-Sheet 2
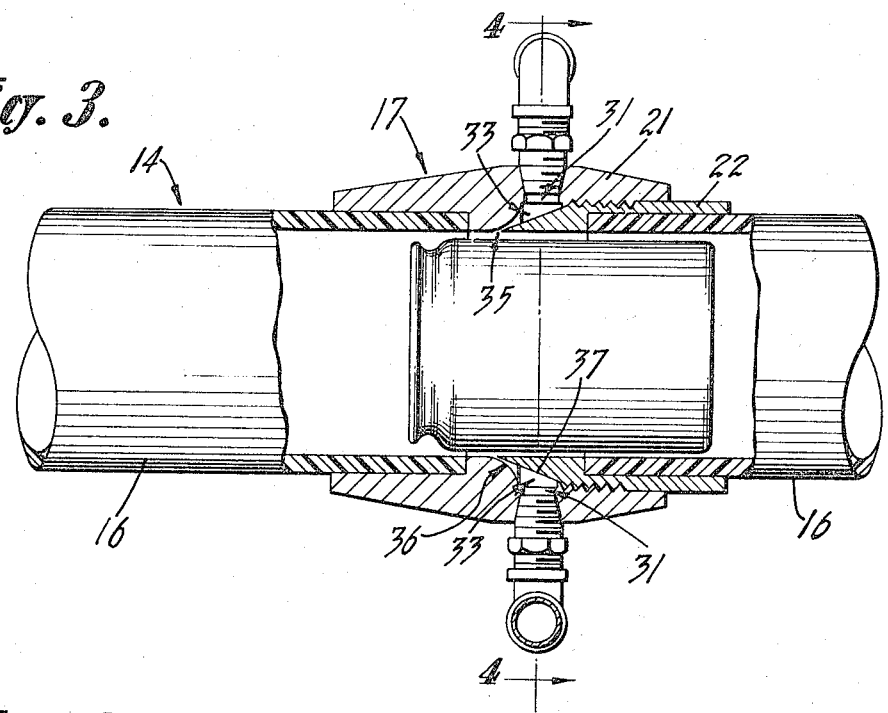
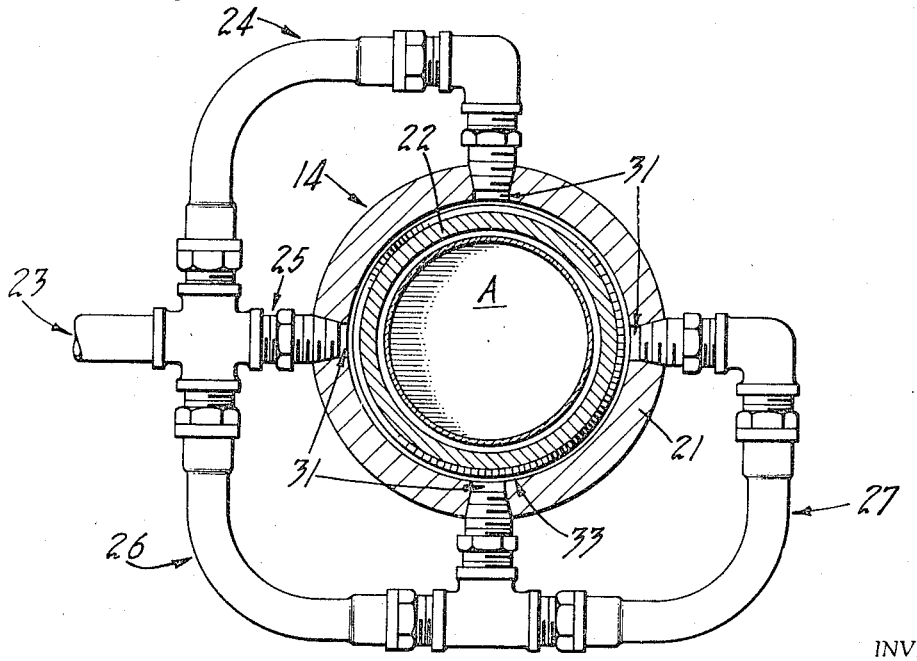
INVENTOR.
GEORGE ALFRED HUPPENTHAL
BY Leonard R. Kohan
ATTORNEY

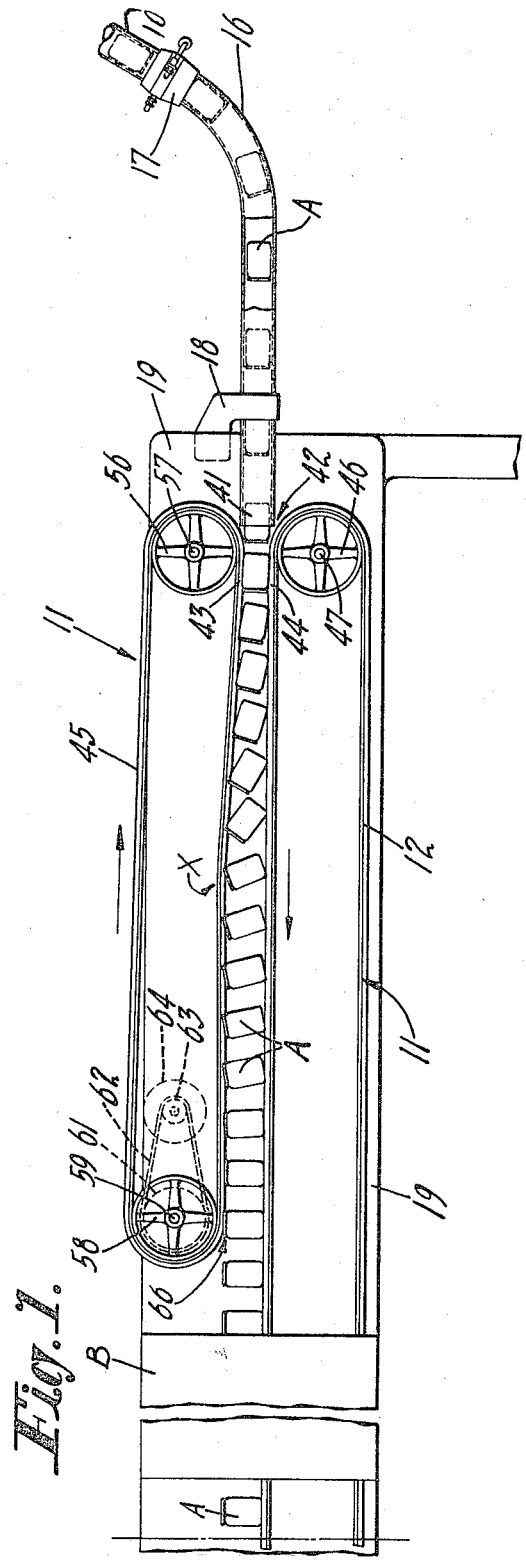

United States Patent Office 3,312,326
Patented Apr. 4, 1967

---

3,312,326
ARTICLE ORIENTING APPARATUS
George Alfred Huppenthal, Titusville, N.J., assignor to American Can Company, New York, N.Y., a corporation of New Jersey
Filed Aug. 23, 1965, Ser. No. 481,481
12 Claims. (Cl. 198—33)

This invention relates to apparatus for orienting articles and more particularly for effecting orientation by rotating or turning articles during their advancement in processional order.

An object of the present invention is the provision of conveying means for engaging substantially opposite portions of an article, such a container, between confronting runs of conveyors, and moving the conveyor runs at different lineal speeds, the speed differential being dependent upon the variation in transverse dimensions of the article.

Another object of the invention is the provision of conveyors with outer article engaging surfaces of resilient and highly frictional material so that the articles is maintained under close control by the confronting conveyor runs as it is turned thereby.

Still another object of the invention is the disposition of the confronting conveyor runs in diverging or converging relationship depending upon whether the transverse dimension of the article between the runs is lesser or greater, respectively, than the transverse dimension of the article as it is delivered from the runs.

Yet another object of the invention is the provision of means for effecting the orientation of articles at high speeds.

Other objects and advantages of the invention will be apparent as it becomes better understood from the following description which, when read in connection with the accompanying drawings, discloses a preferred embodiment of the invention.

Referring to the drawings:

FIG. 1 is a side elevation of a portion of an apparatus embodying the invention;

FIG. 2 is a continuation of FIG. 1 showing a side elevation of the remainder of the apparatus;

FIG. 3 shows a longitudinal cross section through an air delivery nozzle;

FIG. 4 shows a transverse section taken substantially along the line 4—4 in FIG. 3.

Figure 5:
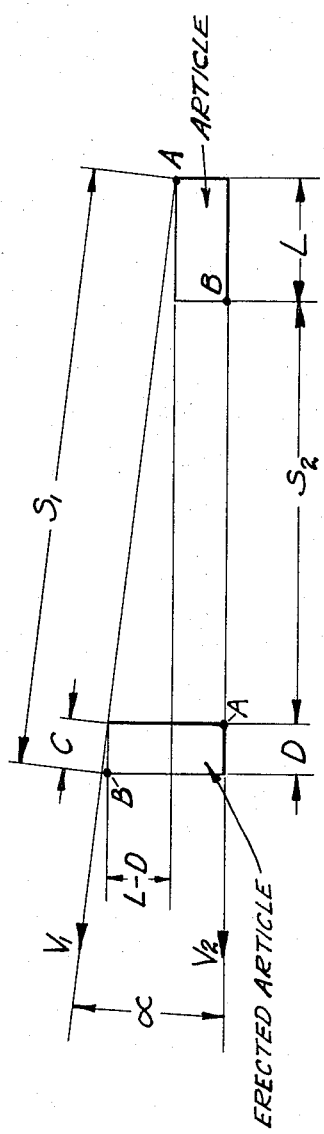
FIG. 5 is a diagram illustrating the relationship of the variables in the system.

As shown in the drawings, the preferred embodiment of the invention comprises a pneumatic conveyor 10 for feeding articles A, such as containers, in spaced processional order to a pair of articles orienting conveyors 11 which rotate each article (in this case clockwise) (FIG. 1) from a horizontal to an upright position. The lower conveyor 12 of the pair delivers the uprighted container to and through a treating station B, and also serves as the lower of a pair of orienting conveyors 13 which turn the containers A clockwise (FIG. 2) from their upright positions back to horizontal positions and discharge the horizontally disposed containers to a pneumatic conveyor 14.

Pneumatic conveyors, such as those shown at 10 and 14, are known to be well adapted for use in conveying containers and like articles at high speeds at which the apparatus of the present invention is capable of being operated. The conveyor comprises a tube 16 (FIGS. 3 and 4), usually in several connected sections having a smooth interior surface, and an air delivery nozzle 17 for introducing air, under pressure, to the tube. The tubes may be secured by brackets 18 to a frame 19 of the apparatus.

Nozzle 17 comprises an outer ring or housing 21 and an inner ring 22 threadedly connected into one end of ring 21 (FIG. 3). The air is led to the nozzle through an inlet pipe 23 and suitable branch connections 24, 25, 26, 27 to inlet ports 31 which lead into an annular passage 33 that terminates in an annular orifice 35. The threaded connection between the housing 21 and the ring 22 also serves to provide an adjustment for the opening of the annular orifice 35 to control the air flow and pattern.

As shown in FIG. 3, one wall 36 of passage 33 and a conical surface 37, formed on the inner end of the inner ring, forms converging surfaces between which the air is conducted to the orifice in the general direction of flow to be given to the articles in the pneumatic conveyor.

At the discharge end 41 (FIG. 1) of pneumatic conveyor 10, each container A is delivered to the receiving end 42 of the orienting conveyors 11 between confronting runs 43, 44 of an upper conveyor belt 45 and the lower conveyor or belt 12, respectively.

The lower belt 12 takes over an idler pulley 46 mounted for rotation at 47 on the frame 19, and a drive pulley 48 (FIG. 2) fixed to a shaft 49 that is journalled for rotation in the frame 19. Also secured to shaft 49 is a sprocket 51 driven through a chain 52 or other suitable means and a motor sprocket 53 by a motor 54 which is secured to the frame 19 in any suitable manner. The lineal speed at which the belt 45 is thus driven is dependent upon the nature of the article, its size, shape, material, etc. However, relatively fragile articles, such as glass jars may be handled at high speeds with safety.

Of course, it is understood that many different drive means could be utilized for the belts without departing from the spirit and scope of the invention.

The upper orienting belt 45 takes over an idler pulley 56, mounted for rotation at 57 on frame 19, and a drive pulley 58 fixed to a shaft 59 that is journalled in the frame 19. A sprocket 61, also secured to the shaft 59, is driven through a chain 62 or other suitable means and a motor sprocket 63 by a motor 64 secured to the frame 19. The pulleys 56 and 58 are so mounted above the run 44 of the lower belt 12 that run 43 diverges from run 44 and the confronting surfaces of the runs are separated by a distance equal to about slightly less than the diameter of the container A at the receiving end of the runs and by a distance equal to slightly less than the height of the erected container at the discharge end 66 of the runs 43, 44. This assures a secure grip by the runs on the container as it is advanced and turned therebetween.

To turn the containers as they are advanced between the runs, run 44 is given a greater lineal speed than run 43. The difference in distance traveled by the runs between the receiving end 42 and the discharge end 66 is substantially the sum of the length of a container and its diameter. It should also be noted that the maximum separation of the runs is at the point where the container is turned so that its maximum transverse dimension, substantially the diagonal dimension of its rectangular section, is interposed between the runs. This is approximately at the point X in FIG. 1. One or both of the runs are free to flex or yield between its pulleys so that this spatial difference is readily accommodated.

Furthermore, the belts are preferably provided on their outer friction surfaces with relatively thick resilient material. This may be a layer of about an inch of polyurethane foam, or the like, bonded or adhered to some flexible material such as leather or rubber that gives the laminated structure greater tensile strength.

Of course, various means may be used for imparting the desired different speeds to the orienting belts. The drawings show the expedient of utilizing motor sprockets of different diameters, where the other sprockets, drive pulleys, and motor speeds remain constant. For instance, pulleys 48 and 58 are of the same diameter, sprockets 51 and 61 are smaller but of the same diameter. Therefore, the motor sprocket 53 being larger in diameter than the motor sprocket 63, run 44 will advance faster, from right to left in FIGS. 1 and 2, than the run 43 to produce the desired turning or uprighting of the containers. If desired a single power source with suitable drive means can be used to power both belts.

At the treating station B, any desired treatment of the container may be effected. It may be sprayed, or filled, or gassed, or steamed, etc. at the station before entering the receiving end 71 of the article orienting conveyors 13 between confronting runs 72, 73 of lower conveyor belt 12 and an upper conveyor belt 74, respectively.

The upper belt takes over an idler pulley 75 mounted for rotation at 76 on the frame 19, and a drive pulley 77 that is secured to a shaft 78 that is journalled for rotation in the frame 19. A sprocket 81 is also secured to the shaft 78 and is driven through a chain 82 and a motor sprocket 83 by a motor 84 suitably secured to the frame 19.

For reasons similar to those given above in describing the effect of the different sizes of motor sprockets 53, 63 on the relative speeds of runs 43 and 44, the motor sprocket 53 being larger than the motor sprocket 83, the confronting run 72 will move faster than confronting run 73.

Furthermore, the pulleys 76 and 77 are so mounted above the run 72 of the lower belt 12 that the run 73 of the upper belt 74 converges toward the run 72 and the confronting surfaces of the runs at the receiving end 71 are spaced apart by a distance equal to about slightly less than the height of a container A, while the runs are spaced at about slightly less than the diameter of a container at the discharge end 86 of the runs. The differential movement of the runs and their converging attitudes thus combine to rotate or turn each container clockwise, as viewed in FIG. 2, from a vertical to a horizontal position, as it moves from the receiving end 71 to the discharge end 86, where the horizontally disposed treated containers are fed in spaced processional order to the pneumatic conveyor 14 which functions in substantially the same manner as pneumatic conveyor 10 described above, to convey the treated containers from the orienting conveyors.

FIGURE 5 is a diagram relating the belt speed of the erecting conveyor to the belt angle and a container's dimensions and gives the following formulae:

$$V_1 = \frac{S_1}{t_1} \quad V_2 = \frac{S_2}{t_2} \quad t_1 = t^1$$

$$\frac{V_1}{V_2} = \frac{S_1}{S_2} = \frac{D + \frac{L-D}{\sin \alpha}}{\frac{L-D}{\tan \alpha} - L}$$

where $L$=height of container (inches)
$D$=diameter of container (inches)
$\alpha$=angle between belts during erecting (degrees)
$S_1$ and $S_2$=distance of travel of contact points A and B>$\alpha$ respectively (inches)
$V_1$=velocity of belt 1 (inch/sec.)
$V_2$=velocity of belt 2 (inch/sec.)
$t_1=t_2$=time required for points A and B to reach erected position (sec.).

This is a practical formula for a given size of container to be erected between two belts which will give the relative speed (ratio) of the belts (as long as one belt speed is fixed), the angle between the belts, or the length of the erecting station.

Thus, if a container having a diameter of 3 inches and a height of 7 inches is to be erected in 0.5 second in a distance of travel of about 24 inches, the angle $\alpha$ can be calculated as:

$$\tan = \frac{L-D}{S_2+L} = \frac{7-3}{14+7} = 0.1905$$

$$\alpha = 10°47''$$

Thus $$S_1 = D + \frac{L-D}{\sin \alpha} = 3 + \frac{4}{0.1871} = 24.2 \text{ inches}$$

$S_2+L+D=24$; thus $S_2=24-(7+3)=14$ inches and the belt velocity ratio is:

$$\frac{V_1}{V_2} = \frac{S_1}{S_2} = \frac{24.2}{14} = 1.74$$

It is to be understood that this formula should be used within the bounds of the physical limitations of any given application under the following guidelines concerning inertial effects which may induce instability in the system:

(1) Input speed too great (the container passes contact points without being gripped thus resulting in no erection).
(2) Erecting speed too great (container falls over).
(3) Belt speed too great (free standing container subject to instability and tip over).

It is thought that the invention and many of its attendant advantages will be understood from the foregoing description, and it will be apparent that various changes may be made in the form, construction and arrangement of the parts without departing from the spirit and scope of the invention.

I claim:

1. An article orienting apparatus, comprising:
  a pair of endless conveyors having substantially highly frictional surfaces, said conveyors disposed one above the other with the lower run of the upper conveyor confronting the upper run of the lower conveyor throughout a substantial length of both runs between an article receiving end and an article discharge end;
  said confronting runs being spaced apart by a predetermined distance at said receiving end and by a different predetermined distance at said discharge end, said spacing being dependent upon the variance in dimensions across the transverse section of the articles in a plane normal to the longitudinal of said runs;
  and means for moving said runs at predetermined different speeds in a direction from said receiving end to said discharge end of said runs whereby each article is engaged by the friconal surfaces of said runs and is rotated thereby to a predetermined different orientation at said discharge end of the runs.

2. An article orienting apparatus as set forth in claim 1 additionally including feeding means provided for advancing a plurality of articles to the receiving end of said conveyor runs in spaced processional order.

3. An article orienting apparatus as set forth in claim 2 wherein said feeding means is a pneumatic conveyor through which the articles are advanced and delivered to the receiving end of the confronting runs of the endless conveyors.

4. An article orienting apparatus as set forth in claim 1 wherein the transverse section of the article is substantially rectangular and the speed on said runs, the degree of spacing between said runs, and the distance between said receiving and discharge ends is predetermined to effect a ninety degree (90°) rotation of the article.

5. An article orienting apparatus as set forth in claim 4 wherein the article is a substantially cylindrical container and the speed of one of said conveyor overruns that of the other conveyor by substantially the sum of the length and the diameter of the container between said receiving end and said discharge end of the runs.

6. An article orienting apparatus as set forth in claim 5 wherein the container is fed to said receiving end of the runs in a horizontal position with its axis substantially longitudinal relative to its path, whereby the container is rotated from said horizontal position to an upright position by the coaction of said runs.

7. An article orienting apparatus as set forth in claim 5 wherein the container is fed to the receiving end of said runs in a vertical position and the container is rotated to a horizontal position.

8. An article orienting apparatus as set forth in claim 1 wherein the conveyors are belts having at least their outer friction surfaces of relatively thick resilient material whereby portions of the article in engagement with said resilient material are temporarily slightly embedded in the material, thereby increasing the frictional and gripping engagement on the article throughout the orienting operation.

9. An article orienting apparatus as set forth in claim 8 wherein said resilient material is foamed polyurethane adhered to a flexible material having greater tensile strength than said foamed polyurethane.

10. An article treating machine, comprising:
  an article treating station;
  a pair of orienting means adjacent said treating station, one for delivering articles to the station and one for receiving treated articles from the station;
  each of said orienting means comprising a pair of endless friction conveyors disposed one above the other with the lower run of the upper conveyor confronting the upper run of the lower conveyor throughout a substantial length of both runs between an article receiving end and an article discharge end;
  and means for moving said conveyor runs in the same direction but at different linear speeds, whereby a said article entering a said receiving end in one position is turned during its advancement by and between said runs to a different position at a said delivery end of the runs.

11. An article treating machine as set forth in claim 10 wherein the upper run of the lower conveyor extends throughout the length of the orienting means and treating station, said run cooperating with each of the upper conveyors to rotate the article before and after treatment.

12. A system for erecting an article wherein two endless frictional conveyors are disposed one above the other, both conveyors moving in the same direction at different speeds and diverging from each other for erecting an article received at the closest point of approach of said conveyors, the improvement wherein said system operates under the following formulae:

$$V_1 = \frac{S_1}{t_1} \qquad V_2 = \frac{S_2}{t_2}$$

and $$\frac{V_1}{V_2} = \frac{S_1}{S_2} = \frac{D + \frac{L-D}{\sin \alpha}}{\frac{L-D}{\tan \alpha} - L}$$

where $L$ = height of article (inches)
$D$ = diameter or width of article (inches)
$\alpha$ = angle between conveyors during erecting (degrees)
$S_1$ and $S_2$ = distance of travel of first contact points on article (inches)
$V_1$ = veloctiy of conveyor 1 (inch/second)
$V_2$ = velocity of conveyor 2 (inch/second)
$t_1 = t_2$ = time required for article to reach fully erected position (seconds)

References Cited by the Examiner
UNITED STATES PATENTS

| | | | |
|---|---|---|---|
| 2,534,221 | 12/1950 | Borkmann | 198—33 |
| 3,198,581 | 8/1965 | Gamberini | 302—2 |

FOREIGN PATENTS

| | | |
|---|---|---|
| 69,979 | 9/1949 | Denmark. |

EVON C. BLUNK, *Primary Examiner.*
EDWARD A. SROKA, *Examiner.*